(12) United States Patent
Hikichi

(10) Patent No.: US 12,153,835 B2
(45) Date of Patent: Nov. 26, 2024

(54) IMAGE FORMING APPARATUS CAPABLE OF PREVENTING UNINTENDED CHANGE OF SETTINGS INFORMATION OF SHEET FEEDER, METHOD OF CONTROLLING IMAGE FORMING APPARATUS, AND STORAGE MEDIUM

(71) Applicant: CANON KABUSHIKI KAISHA, Tokyo (JP)

(72) Inventor: Yukiyoshi Hikichi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/183,382

(22) Filed: Mar. 14, 2023

(65) Prior Publication Data
US 2023/0297295 A1    Sep. 21, 2023

(30) Foreign Application Priority Data

Mar. 17, 2022   (JP) ................................. 2022-042124

(51) Int. Cl.
*G06F 15/00* (2006.01)
*G06F 3/12* (2006.01)

(52) U.S. Cl.
CPC .......... *G06F 3/1204* (2013.01); *G06F 3/1239* (2013.01); *G06F 3/1253* (2013.01); *G06F 3/1285* (2013.01)

(58) Field of Classification Search
None
See application file for complete search history.

(56) References Cited

U.S. PATENT DOCUMENTS

| | | | | |
|---|---|---|---|---|
| 2006/0020805 A1* | 1/2006 | Osaka | ............... | H04N 1/00464 713/176 |
| 2013/0321850 A1* | 12/2013 | Tsuji | ................. | G06K 15/4095 358/1.14 |
| 2013/0335475 A1* | 12/2013 | Yano | .................... | B41J 13/0009 347/16 |
| 2014/0376028 A1* | 12/2014 | Tsujita | ................ | G06K 15/406 358/1.14 |
| 2016/0062291 A1* | 3/2016 | Tao | .................... | G03G 15/6514 399/80 |

FOREIGN PATENT DOCUMENTS

JP          2011230896 A      11/2011

* cited by examiner

*Primary Examiner* — Mark R Milia
(74) *Attorney, Agent, or Firm* — ROSSI, KIMMS & McDOWELL LLP

(57) ABSTRACT

An image forming apparatus is equipped with a plurality of sheet feeders. A change request for changing settings information of a designated one of the plurality of sheet feeders is received. There is stored change permission/inhibition information in which a condition for permitting a change of the settings information is set on an sheet feeder-by-sheet feeder basis. Settings information of a sheet feeder designated by the change request is changed based on the change permission/inhibition information. In a case where a request source of the change request satisfies the condition for permitting a change of settings information, settings information of the designated sheet feeder is changed, whereas in a case where a request source of the change request does not satisfy the condition for permitting a change of settings information, settings information of the designated sheet feeder is not changed.

10 Claims, 16 Drawing Sheets

<PERMISSION OF UPDATE OF SHEET FEEDER SETTINGS>

To permit update of sheet feeder settings from a desired operation screen, select check box(es) for sheet feeder(s).

|   | EXTERNAL APPLICATION | PRINTER OPERATION PANEL |
|---|---|---|
| ❶ A4 | ☐ | ☑ |
| ❷ A4 | ☐ | ☑ |
| ❸ A4 | ☐ | ☑ |
| ❹ A4 | ☐ | ☑ |
| ❺ A4 | ☑ | ☐ |
| ❻ A4 | ☑ | ☐ |
| ❼ A4 | ☑ | ☐ |

701 — external application column
702 — printer operation panel column

[CANCEL] 704    703 [OK]

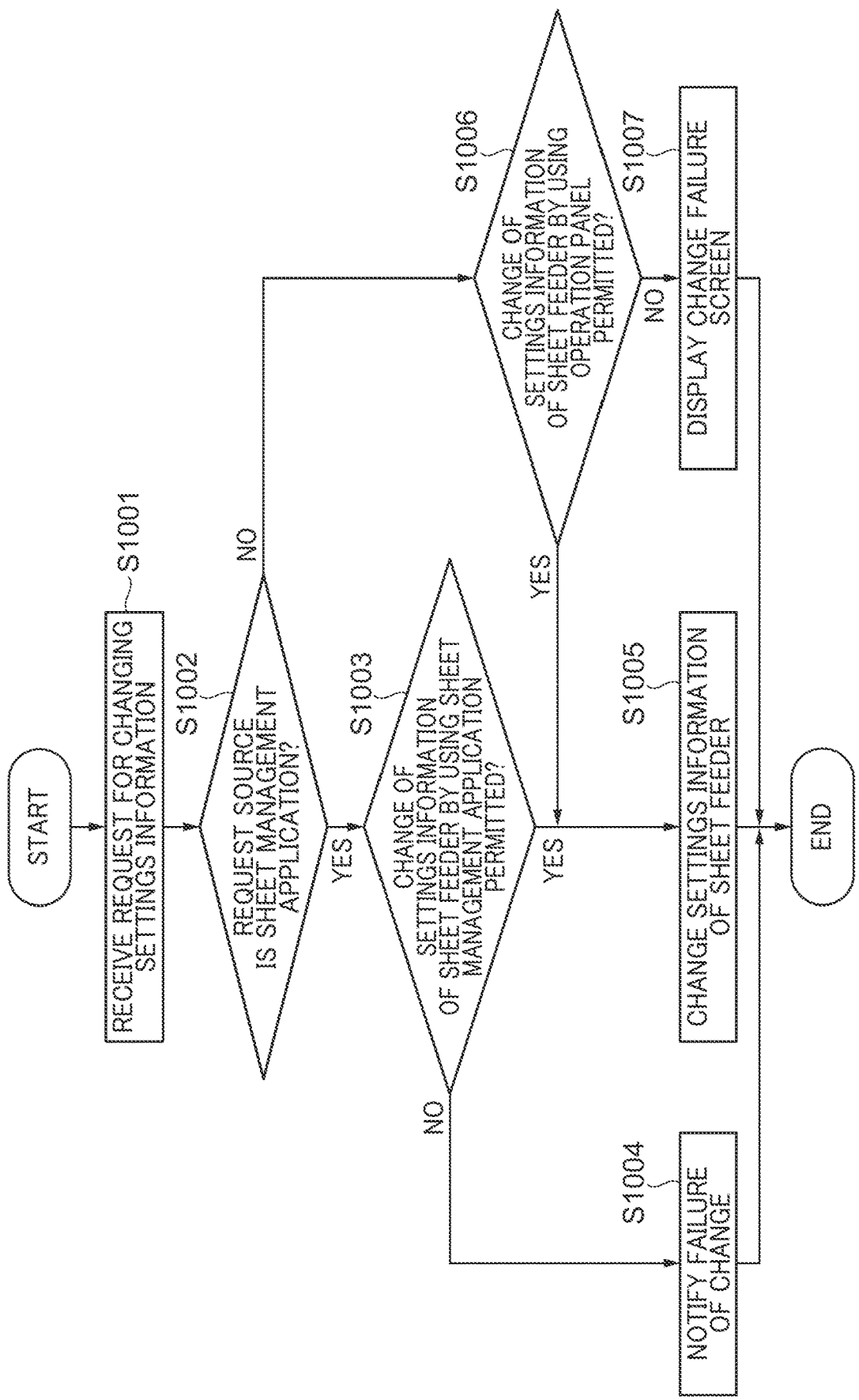

FIG. 11

PRINT CONTROLLER SERVER 5D484S4 — 1101

PRINTER-01 – 192.168.1.2 | Processing | Printing
Printer is ready

Server — 1102

- server01
- server02
- server03
- server04

Consumables — 1104

K:100%, C:100% M:100% Y:100%
Deck1
A3, Plain(100g/m²) SEF
Deck2
A3, Plain(100g/m²) SEF

Printing — 1103

| Job Status | Job Name | User | Size | Pages | Copies |
|---|---|---|---|---|---|
| In Progress | #200 Photo book | 002 | 6M | 15 | 1 |
| In Queue | #201 Photo book | 002 | 8M | 20 | 1 |

Processing — 1105

| Job Status | Job Name | User | Size | Pages | Copies |
|---|---|---|---|---|---|
| | | | | | |

In Queue(0) | Printed(0) | Archived(0)

1106

| Output State | Job Name | User | Size | Pages | Copies |
|---|---|---|---|---|---|
| Interrupted | #101 User manual (color) | 001 | 12M | 15 | 50 |
| Printed | #102 User manual (B/W) | 001 | 6M | 20 | 100 |
| Printed | #103 Seminar text | 002 | 4M | 30 | 70 |
| Printed | #104 Annual report | 002 | 6M | 10 | 200 |

FIG. 13

⟨PERMISSION OF UPDATE OF SETTINGS OF SHEET FEEDER⟩

To permit update of the settings of sheet feeders from a desired operation screen, select associated check boxes.

| | HOST IP ADDRESS PERMITTED TO UPDATE | HOST IP ADDRESS INHIBITED TO UPDATE | PERMITTED TO UPDATE FROM PRINTER OPERATION PANEL |
|---|---|---|---|
| ❶ A4 | ☐ | ☒ 113.225.1.200 | ☒ |
| ❷ A4 | ☐ | ☒ 113.225.1.200 | ☒ |
| ❸ A4 | ☐ | ☒ 113.225.1.200 | ☒ |
| ❹ A4 | ☐ | ☒ 113.225.1.200 | ☒ |
| ❺ A4 | ☒ 113.225.1.2 | ☐ | ☐ |
| ❻ A4 | ☒ 113.225.1.2 | ☐ | ☐ |
| ❼ A4 | ☒ 113.225.1.2 | ☐ | ☐ |

You can update the settings from all operation screens for a sheet feeder which has not been used for a time period designated below.

[ ] minutes

[ OK ]

IMAGE FORMING APPARATUS CAPABLE OF PREVENTING UNINTENDED CHANGE OF SETTINGS INFORMATION OF SHEET FEEDER, METHOD OF CONTROLLING IMAGE FORMING APPARATUS, AND STORAGE MEDIUM

BACKGROUND OF THE INVENTION

Field of the Invention

The present invention relates to an image forming apparatus that is capable of preventing unintended change of settings information of a sheet feeder, a method of controlling the image forming apparatus, and a storage medium.

Description of the Related Art

In recent years, a case where one printer is used for a plurality of business operations has increased. For example, in an office operation, an in-company business document is printed on sheets. In the office operation, types of sheets used for printing are limited, and hence it is only required to make sheets always available which are usually used, such as plain paper sheets. On the other hand, in a production print operation, such as creation of a tool for sales promotion and seminar text, special sheets are used. In such a form of printing operation in which one printer is used for a plurality of operations as described above, for example, a sheet feeder in which special sheets are set is set as a dedicated sheet feeder which can be used only by specific users (see e.g. Japanese Laid-Open Patent Publication (Kokai) No. 2011-230896). This makes it possible to improve the convenience of the specific users and prevent the special sheets from being used for printing by the other users.

Further, in the production print operation, a variety of types of sheets are used, and hence settings information of sheet feeders, such as information associated with sheets stored in the sheet feeders, is frequently changed. To cope with this, a sheet management application for easily changing settings information of the sheet feeders of the printer is used.

However, in the conventional technique, there is no limit to the change of the settings information of the sheet feeders, and hence there is a fear that an unintended change of the settings information of the sheet feeders is performed. For example, there occurs such a problem that a user performing a production print operation changes the settings information of a sheet feeder for an office operation by using the sheet management application, or that a user performing an office operation changes the settings information of a sheet feeder for a production print operation by using a console section of the printer.

SUMMARY OF THE INVENTION

The present invention provides an image forming apparatus that is capable of preventing an unintended change of settings information of sheet feeders, a method of controlling the image forming apparatus, and a storage medium.

In a first aspect of the present invention, there is provided an image forming apparatus that is equipped with a plurality of sheet feeders, including a reception unit configured to receive a change request for changing settings information of a sheet feeder designated out of the plurality of sheet feeders, a holding unit configured to hold change permission/inhibition information in which a condition for permitting a change of the settings information is set on an sheet feeder-by-sheet feeder basis, and a control unit configured to change settings information of a sheet feeder designated by the change request, based on the change permission/inhibition information, wherein in a case where a request source of the change request satisfies the condition for permitting a change of settings information, the control unit changes settings information of a sheet feeder designated by the change request, whereas in a case where a request source of the change request does not satisfy the condition for permitting a change of settings information, the control unit does not change settings information of a sheet feeder designated by the change request.

In a second aspect of the present invention, there is provided a method of controlling an image forming apparatus that is equipped with a plurality of sheet feeders, including receiving a change request for changing settings information of a sheet feeder designated out of the plurality of sheet feeders, holding change permission/inhibition information in which a condition for permitting a change of the settings information is set on an sheet feeder-by-sheet feeder basis, and changing settings information of a sheet feeder designated by the change request based on the change permission/inhibition information, wherein said changing includes changing settings information of a sheet feeder designated by the change request in a case where a request source of the change request satisfies the condition for permitting a change of settings information, and not changing settings information of a sheet feeder designated by the change request in a case where a request source of the change request does not satisfy the condition for permitting a change of settings information.

According to the present invention, it is possible to prevent an unintended change of settings information of sheet feeders.

Further features of the present invention will become apparent from the following description of exemplary embodiments (with reference to the attached drawings).

BRIEF DESCRIPTION OF THE DRAWINGS

FIG. 5 is a diagram showing an example of a top screen of a sheet management application, which is displayed on a display device connected to the print control apparatus appearing in FIG. 1.

FIG. 7 is a diagram showing an example of an update permission screen displayed on the operation panel of the image forming apparatus appearing in FIG. 1.

FIG. 10 is a flowchart of a sheet feeder information-setting process performed by the image forming apparatus appearing in FIG. 1.

FIG. 11 is a diagram showing an example of an operation screen of print job management software in the present embodiment.

FIG. 13 is a diagram showing an example of an update permission screen displayed on the operation panel of the image forming apparatus appearing in FIG. 1.

DESCRIPTION OF THE EMBODIMENTS

The present invention will now be described in detail below with reference to the accompanying drawings showing embodiments thereof. Note that the present invention is not limited to the embodiments described below, and not all combinations of features described in the embodiments are absolutely essential to the solution of the present invention.

Figure 1:
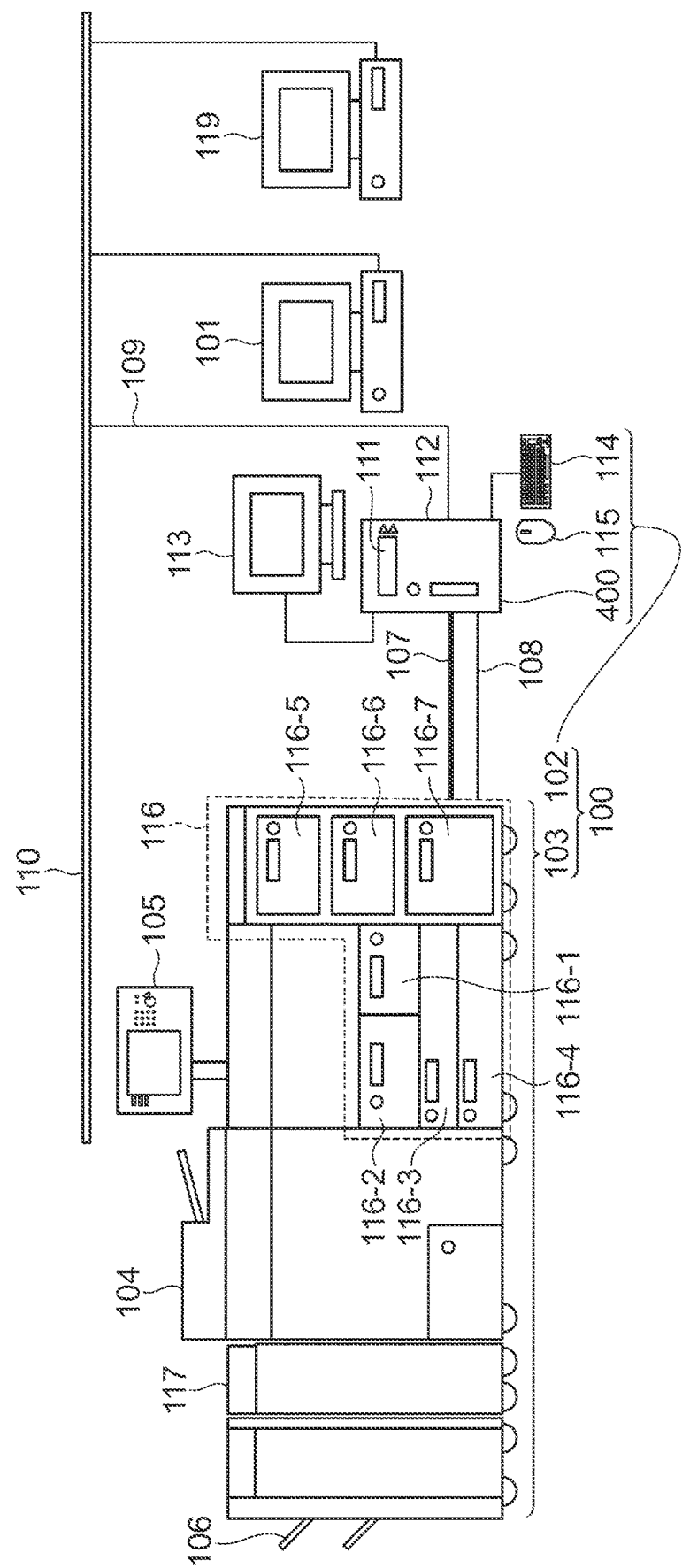
FIG. 1 is a diagram showing an example of a printing system including an image forming apparatus according to an embodiment of the present invention.

FIG. 1 is a diagram showing an example of a printing system 100 including an image forming apparatus 103 according to the present embodiment. The printing system 100 includes a print control apparatus 102 and the image forming apparatus 103. The print control apparatus 102 of the printing system 100 is connected to a LAN 110 via an Ethernet (registered trademark) cable 109 and communicates with a client computer 101 and a client computer 119 via the LAN 110. Note that LAN is an abbreviation of local area network. Further, the print control apparatus 102 is connected to the image forming apparatus 103 via an image video cable 107 and a control cable 108. In the present embodiment, a configuration in which the image forming apparatus 103 is not directly connected to the LAN 110 and communicates with the client computer 101 and the client computer 119 via the print control apparatus 102 will be described by way of example. Each of the client computer 101 and the client computer 119 starts an application to provide a print instruction and the like to the printing system 100.

The print control apparatus 102 performs image processing in cooperation with the image forming apparatus 103. The print control apparatus 102 includes a controller unit 400 and a display section 111. Note that details of the controller unit 400 will be described hereinafter. The display section 111 is used to display minimum required information for operating the print control apparatus 102, for example, options for power-on and power-off instructions and options for instructing display of an IP address. A user performs an operation of selecting an option displayed on the display section 111 by using an operation button section 112 of the print control apparatus 102. Further, to the print control apparatus 102, an external display device 113, a keyboard 114, and a pointing device 115 are connected. Note that the external display device 113 may be configured to have a function of a position input device, such as a touch pad, and also serve as the pointing device 115.

The image forming apparatus 103 is comprised of a scanner section 104, an operation panel 105, a sheet feed unit 116, a reading unit 117, and a sheet discharge unit 106. The image forming apparatus 103 is a multifunction peripheral having a plurality of functions. For example, the image forming apparatus 103 performs image processing on data received from the print control apparatus 102. Further, the image forming apparatus 103 is capable of copying data read by the scanner section 104 and transmitting the read data to a shared folder. The user provides a variety of instructions, including a scan instruction, by operating a variety of keys of the operation panel 105. The operation panel 105 displays a variety of information, including an execution state of scan processing. The sheet discharge unit 106 discharges sheets on each of which an image has been formed.

The sheet feed unit 116 is a device in which sheets used for printing are set, and is comprised of sheet feeders 116-1 to 116-7. In the image forming apparatus 103, when execution of printing is instructed from a user, one sheet feeder is selected from the sheet feeders 116-1 to 116-7 and sheets are fed from the selected sheet feeder. Note that the number of sheet feeders in the sheet feed unit 116 varies with the option configuration of the image forming apparatus 103. The reading unit 117 includes a sensor for reading a chart printed so as to perform a variety of adjustment, such as image position adjustment, density unevenness correction, and secondary transfer voltage adjustment.

In the printing system 100, the image forming apparatus 103 is used for a plurality of operations, including an office operation and a production print operation. In the present embodiment, it is assumed that sheets for the office operation are set in the sheet feeders 116-1 to 116-4, and special sheets for the production print operation are set in the sheet feeders 116-5 to 116-7, by way of example.

Figure 2:
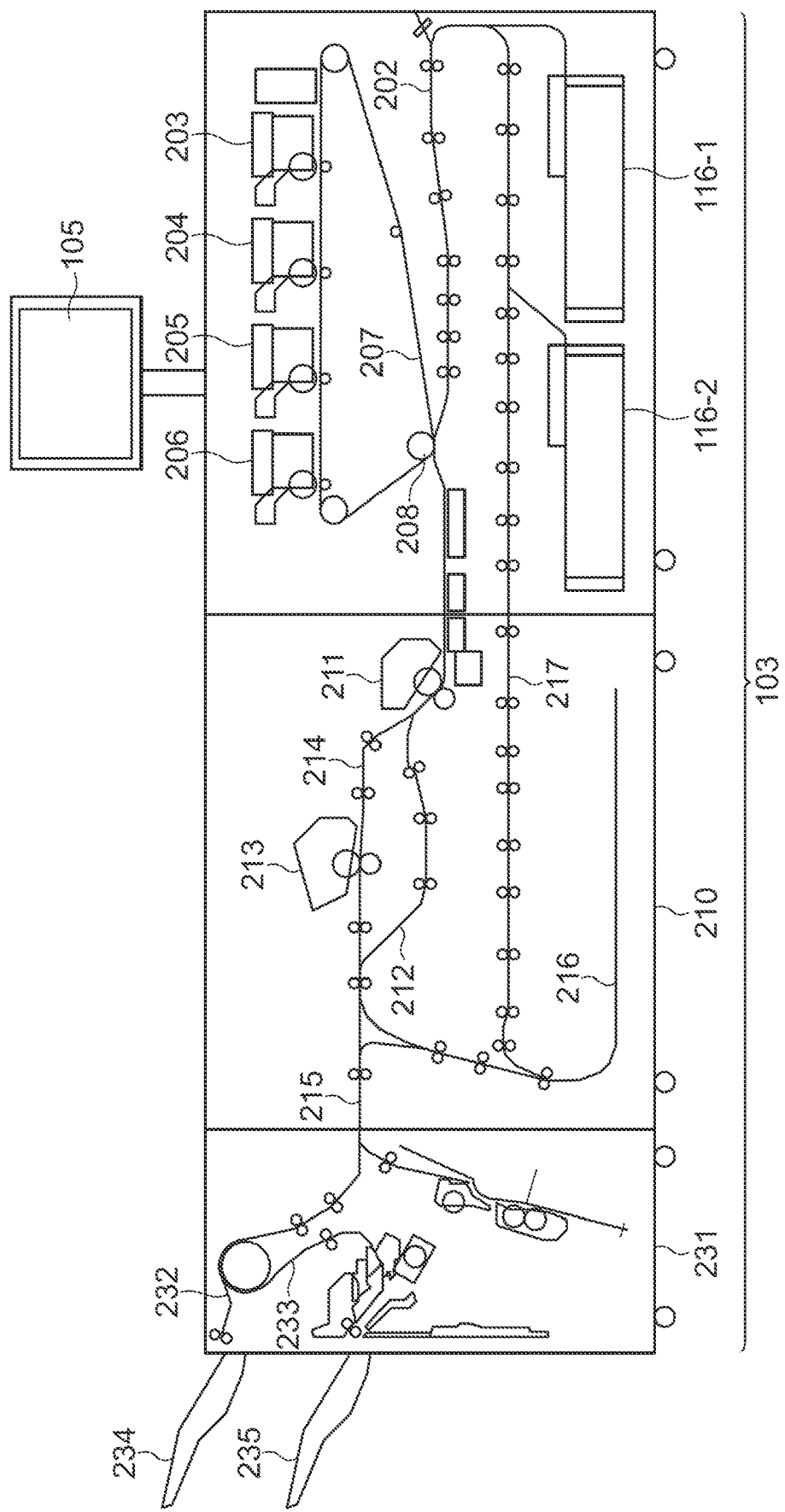
FIG. 2 is a cross-sectional view of the image forming apparatus appearing in FIG. 1.

FIG. 2 is a cross-sectional view of the image forming apparatus 103 appearing in FIG. 1. A print engine 210 includes the sheet feed unit 116. Note that in FIG. 2, illustration of the sheet feed unit 116 is partially omitted, and only the sheet feeders 116-1 and 116-2 of the sheet feed unit 116 are illustrated. A variety of types of sheets can be set in the sheet feeders 116-1 to 116-7, respectively. The sheet feeders 116-1 to 116-7 each separate only the topmost one of the sheets set therein and conveys this sheet onto a sheet conveying path 202. Developing stations 203 to 206 form toner images thereon using color toner of Y, M, C, and K, respectively. The formed toner images are first sequentially transferred onto an intermediate transfer belt 207 as primary transfer. The intermediate transfer belt 207 is rotated in a clockwise direction as viewed in FIG. 2. The resulting toner image on the intermediate transfer belt 207 is transferred onto a sheet conveyed from the sheet conveying path 202 at a secondary transfer roller 208 as secondary transfer. A fixing unit 211 includes a pressure roller and a heating roller and fixes the toner image to the sheet by passing the sheet between the rollers for melting and pressure-fixing of toner of the toner image. The sheet having passed through the fixing unit 211 is conveyed to a sheet conveying path 215 through a sheet conveying path 212. In a case where the sheet is a special sheet further requiring melting and pressure-fixing of toner to fix the toner image, after passing through the fixing unit 211, this sheet is conveyed to a second fixing unit 213 through a sheet conveying path 214. The sheet subjected to additional melting and pressure-fixing of toner by the second fixing unit 213 is conveyed to the sheet conveying path 215. Here, in a case where the print mode is set to double-sided printing, the sheet is conveyed not to the sheet conveying path 215 but to a sheet inversion path 216 for inversion, and is then conveyed to a double-sided conveying path 217. Then, a toner image is transferred onto a second surface of the sheet at the secondary transfer roller 208 as secondary transfer.

The sheet conveyed from the print engine 210 is conveyed to a finisher 231. In the finisher 231, finishing processing, such as stapling (one-position/two-position binding), punching (forming of two holes/three holes), or saddle-stitch bookbinding, is performed on the conveyed sheet. The finisher 231 is equipped with the sheet discharge unit 106 including a tray 234 and a tray 235. A sheet conveyed through a sheet conveying path 232 is discharged onto the tray 234, and a sheet conveyed through a sheet conveying path 233 is discharged onto the tray 235.

Figure 3A:
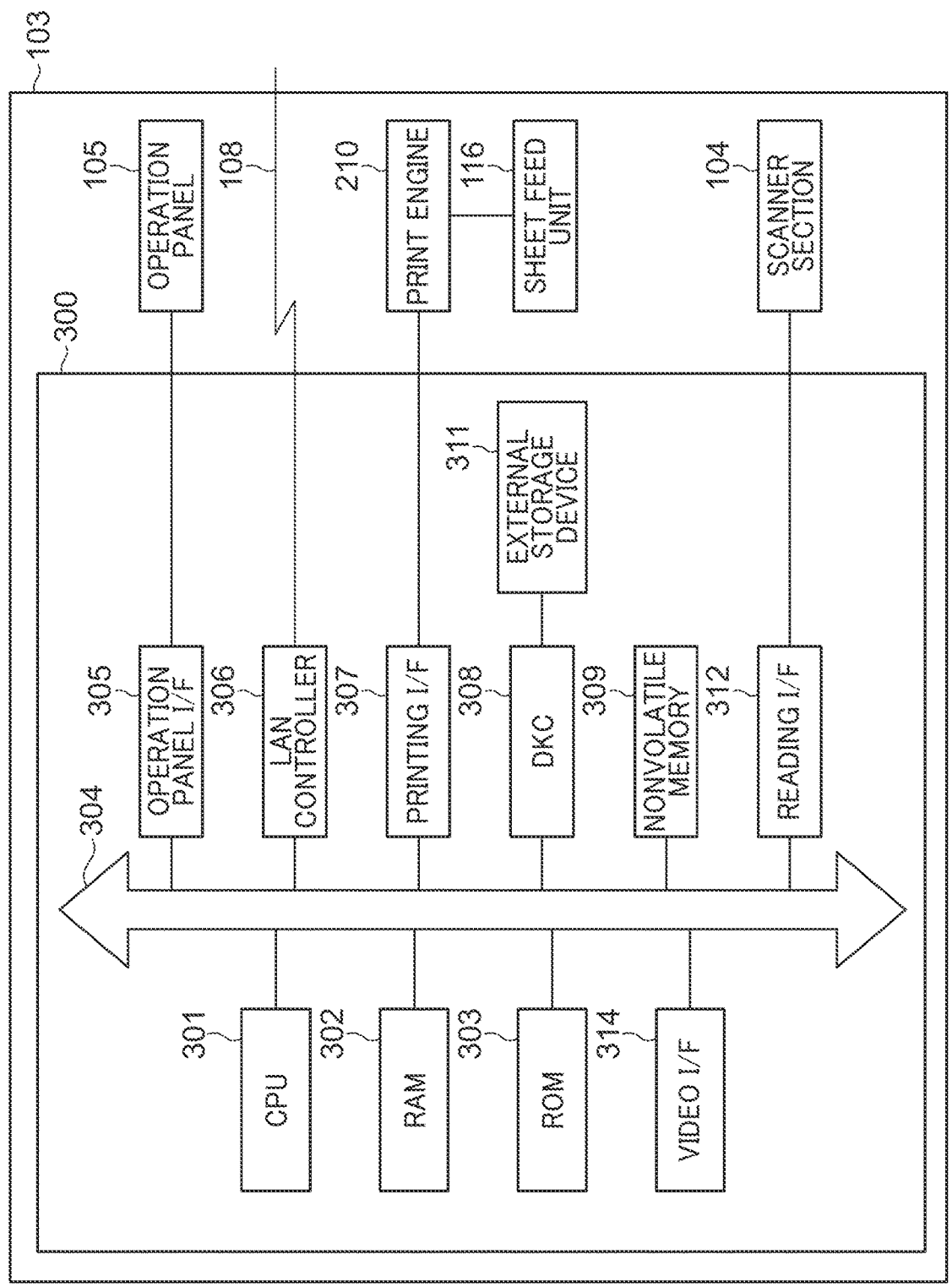
FIG. 3A is a schematic block diagram of a controller unit included in the image forming apparatus appearing in FIG. 1.

FIG. 3A is a schematic block diagram of a controller unit 300 included in the image forming apparatus 103 appearing in FIG. 1.

Referring to FIG. 3A, the controller unit 300 includes a CPU 301, a RAM 302, a ROM 303, an operation panel I/F 305, a LAN controller 306, a printing I/F 307, a DKC 308, a nonvolatile memory 309, a reading I/F 312, and a video I/F 314. These components are interconnected via a system bus 304. Note that I/F is an abbreviation of interface. DKC is an abbreviation of disk controller. Further, the controller unit 300 includes an external storage device 311 connected to the DKC 308.

The CPU 301 performs centralized control of a variety of devices connected to the system bus 304 by loading control programs stored in the ROM 303 or the external storage device 311 into the RAM 302 and executing the loaded programs. For example, the CPU 301 outputs an image signal as output information to the print engine 210 connected thereto via the printing I/F 307 and acquires an image signal from the scanner section 104 connected thereto via the reading I/F 312. Further, the CPU 301 controls the sheet feed unit 116 connected to the print engine 210 and acquires a state of the sheet feed unit 116, via the printing I/F 307. Further, the CPU 301 communicates with the print control apparatus 102 via the LAN controller 306 and the control cable 108.

The RAM 302 mainly functions as a main memory, a work memory, and the like, for the CPU 301. The external storage device 311 is a storage device, such as a hard disk drive (HDD) or an IC card, and an access to the external storage device 311 is controlled by the DKC 308. The external storage device 311 stores applications, font data, form data, and so forth, and is used as a job storage area for temporarily spooling a print job and controlling the spooled job from the outside. Further, the external storage device 311 stores image data generated by the scanner section 104 and image data of print jobs, as BOX data. The external storage device 311 is used as an area for storing BOX data that is viewed from another apparatus via the LAN 110 and is printed. In the present embodiment, an HDD is used as the external storage device 311 by way of example, and the external storage device 311 holds a variety of logs, such as a job log and an image log. The operation panel 105 is connected to the controller unit 300 via the operation panel I/F 305, and a user can input a variety of information from software keys or hardware keys. The nonvolatile memory 309 stores a variety of settings information set from the operation panel 105 or from another apparatus via or the LAN 110. The video I/F 314 receives image data from the print control apparatus 102.

Figure 3B:
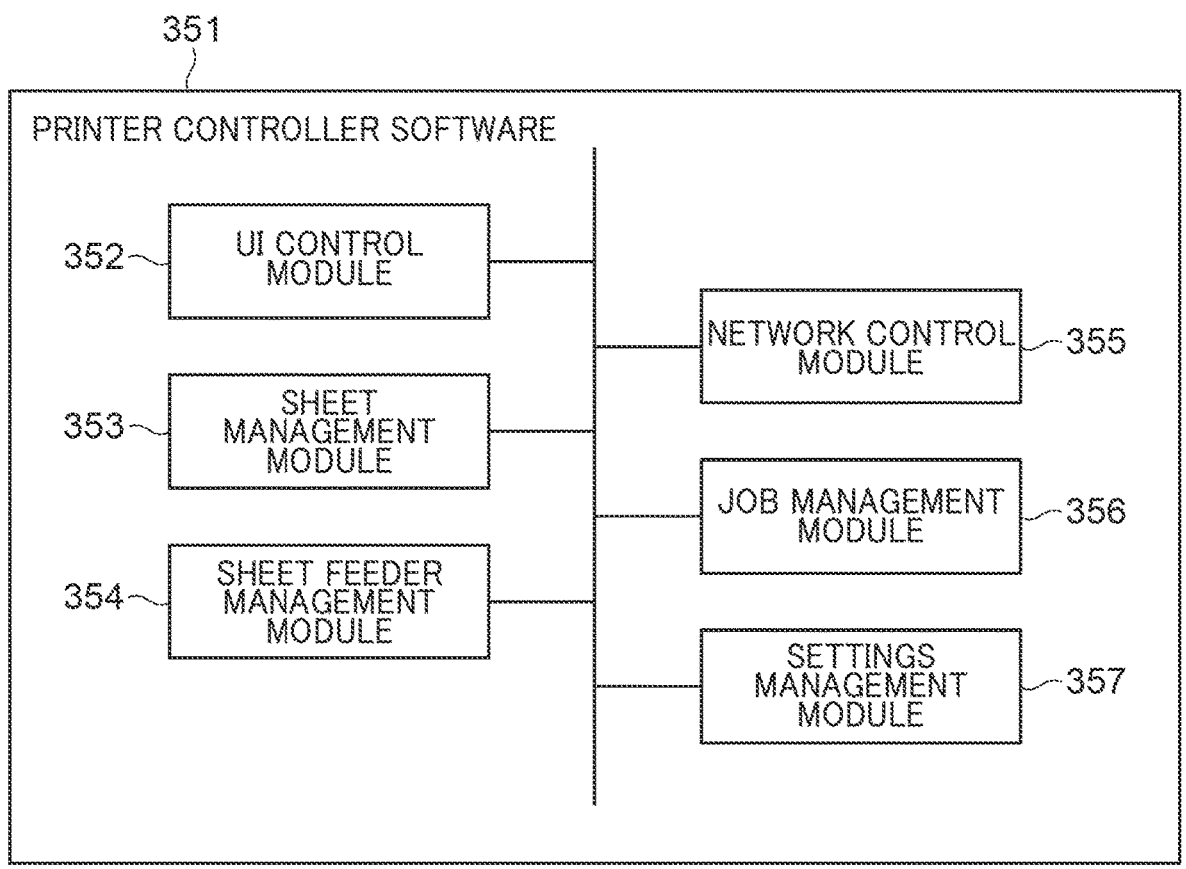
FIG. 3B is a block diagram showing a software configuration of the image forming apparatus appearing in FIG. 1.

FIG. 3B is a block diagram showing a software configuration of the image forming apparatus 103 appearing in FIG. 1. As shown in FIG. 3B, printer controller software 351 that controls the image forming apparatus 103 includes a UI control module 352, a sheet management module 353, and a sheet feeder management module 354. Further, the printer controller software 351 includes a network control module 355, a job management module 356, and a settings management module 357. Processing operations performed by the above-mentioned modules are realized by the CPU 301 executing programs loaded into the RAM 302.

The UI control module 352 performs control for displaying a screen on the operation panel 105. The sheet management module 353 stores, in the settings management module 357, settings information of each sheet feeder, which is acquired from the print engine 210, and settings information of each sheet feeder, which is input by the UI control module 352. The sheet feeder management module 354 manages information on the sheet feed unit 116. The network control module 355 controls communication with the print control apparatus 102 via the LAN controller 306 and communication with the client computer 101 and the like on the LAN 110 via the Ethernet cable 109. The job management module 356 manages a print processing sequence and the processing order of jobs. Further, the job management module 356 manages jobs that are executed by the image forming apparatus 103. The settings management module 357 manages system settings concerning the image forming apparatus 103. The system settings includes, for example, a setting of a language displayed on the operation panel 105, a setting of a display unit system (millimeters or inches) of a sheet size, and so forth.

Figure 4A:
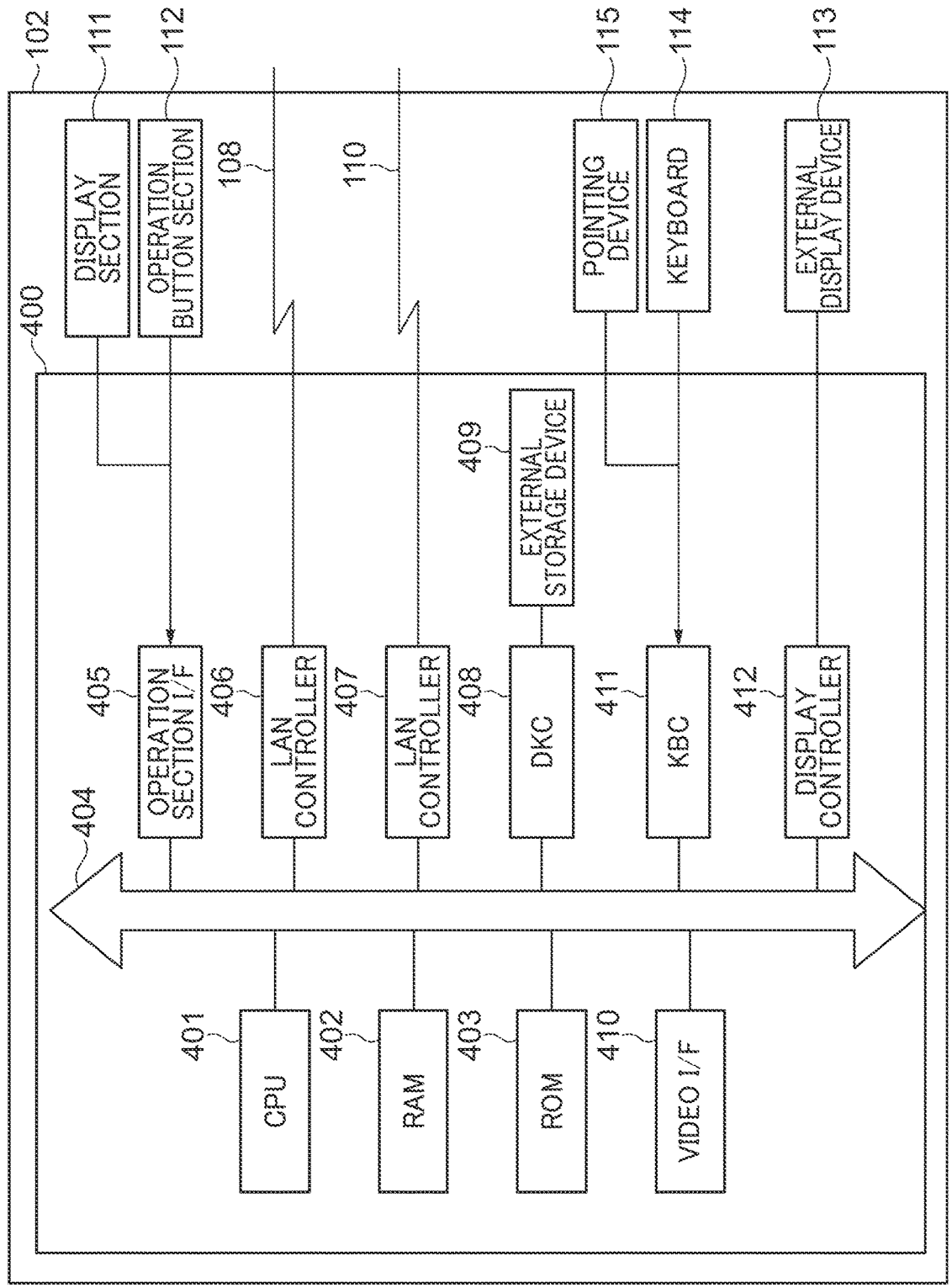
FIG. 4A is a schematic block diagram of a controller unit of a print control apparatus appearing in FIG. 1.

FIG. 4A is a schematic block diagram of the controller unit 400 of the print control apparatus 102 appearing in FIG. 1. Referring to FIG. 4A, the controller unit 400 includes a CPU 401, a RAM 402, a ROM 403, an operation section I/F 405, a LAN controller 406, a LAN controller 407, a DKC 408, a KBC 411, and a display controller 412. These components are interconnected via a system bus 404. Note that KBC is an abbreviation of keyboard controller. Further, the controller unit 400 includes an external storage device 409 connected to the DKC 408.

The CPU 401 performs centralized control of the variety of devices connected to the system bus 404, which are described above, by loading control programs stored in the ROM 403 or the external storage device 409 into the RAM 402 and executing the loaded programs. For example, the CPU 401 communicates with the image forming apparatus 103 via the LAN controller 406 and the control cable 108. Further, the CPU 401 communicates with the client computer 101, the image forming apparatus 103, and the like, on the network, via the LAN controller 407 and the LAN 110.

The RAM 402 mainly functions as a main memory, a work memory, and the like, for the CPU 401. The external storage device 409 is a storage device, such as an HDD or an IC card, and an access to the external storage device 409 is controlled by the DKC 408. The external storage device 409 stores applications, font data, form data, and so forth, and temporarily spools a print job. Further, the external storage device 409 is used as a job storage area for storing data obtained by performing raster image processing (RIP) on the spooled print job.

The operation section I/F 405 controls data exchange between the controller unit 400, and the operation button section 112 and the display section 111. A video I/F 410 transmits image data subjected to the RIP to the image forming apparatus 103. The KBC 411 acquires information input by a user operating the keyboard 114 and the pointing device 115, from the keyboard 114 and the pointing device 115. The display controller 412 includes a video memory provided therein, and according to an instruction received from the CPU 401, draws data in the video memory, and outputs the image data drawn in the video memory to the external display device 113 as video signals.

Figure 4B:
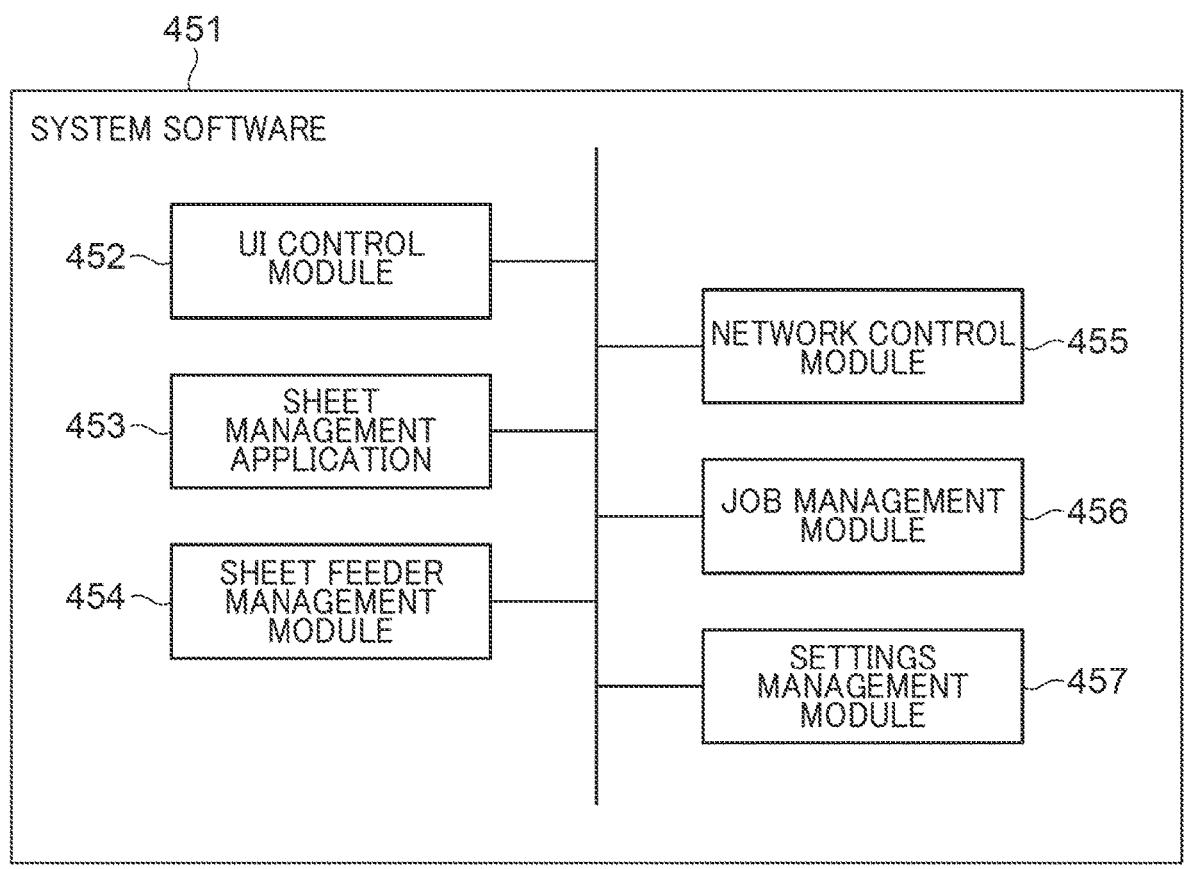
FIG. 4B is a block diagram showing a software configuration of the print control apparatus appearing in FIG. 1.

FIG. 4B is a block diagram showing a software configuration of the print control apparatus 102 appearing in FIG.

1. As shown in FIG. 4B, system software 451 that controls the print control apparatus 102 includes a UI control module 452, a sheet management application 453 (predetermined application), and a sheet feeder management module 454. Further, the system software 451 includes a network control module 455, a job management module 456, and a settings management module 457. Processing operations performed by the above-mentioned modules are realized by the CPU 401 executing programs loaded into the RAM 402.

Figure 5:
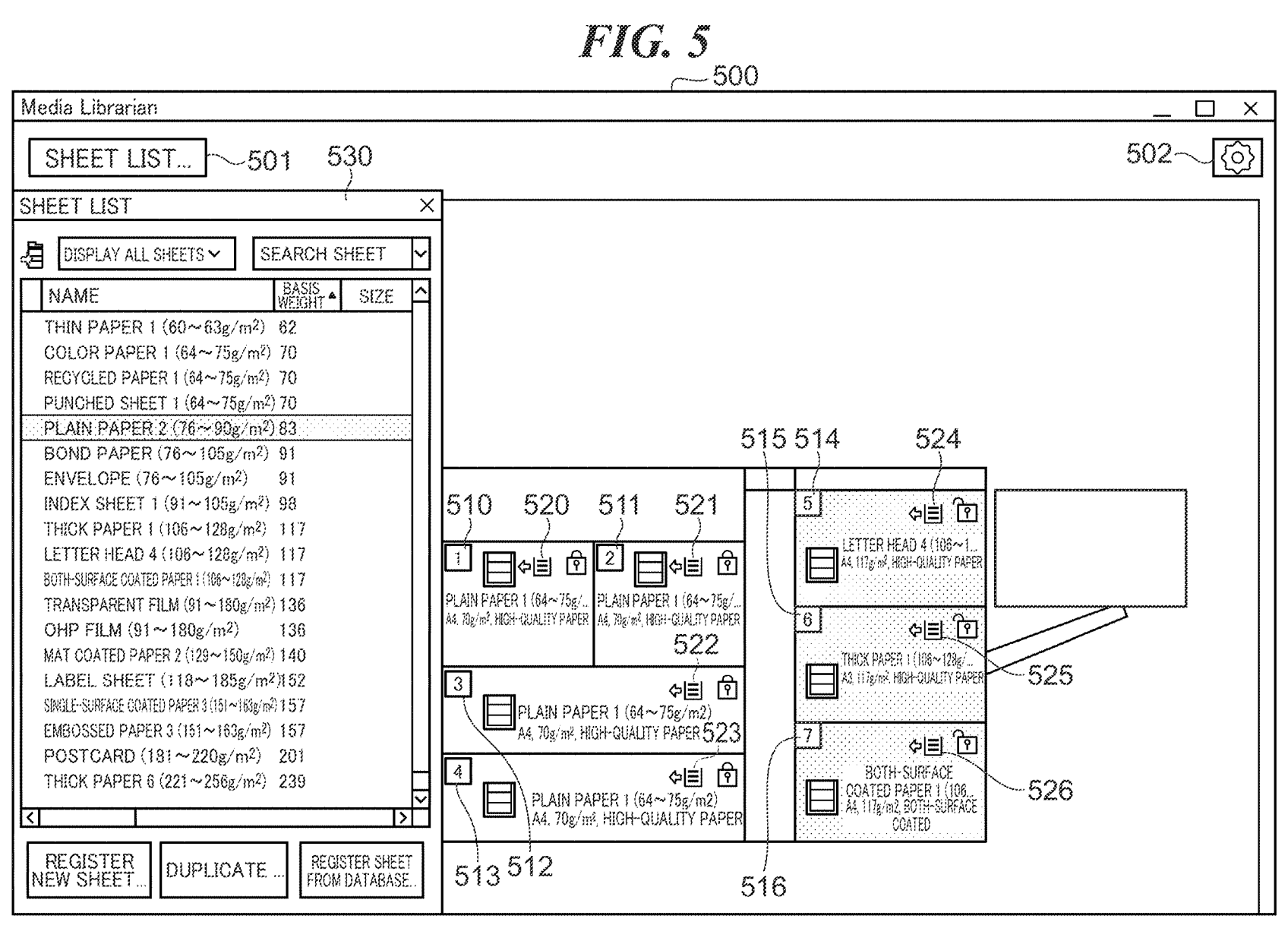

The UI control module 452 controls a screen displayed by the printing system 100. The UI control module 452 can control switching of a language displayed on a screen and the display of a display unit system of a sheet size, according to the settings of the system. The sheet management application 453 manages settings information of the sheet feeders 116-1 to 116-7 of the image forming apparatus 103 connected to the print control apparatus 102. The sheet management application 453 communicates with the image forming apparatus 103 to acquire the settings information of the sheet feeders 116-1 to 116-7 and manages the acquired settings information of the sheet feeders 116-1 to 116-7 in a sheet setting management table. When the sheet management application 453 is started, a top screen 500 is displayed which is shown in FIG. 5 for setting the settings information of the sheet feeders 116-1 to 116-7 of the image forming apparatus 103 connected to the print control apparatus 102. The network control module 455 controls communication with the image forming apparatus 103 via the LAN controller 406 and communication with the client computer 101 and the like on the LAN 110 via the LAN controller 407. The job management module 456 manages the print processing sequence and the order of jobs. Further, the job management module 456 manages jobs received by the print control apparatus 102 and controls data transfer to the image forming apparatus 103 via the LAN controller 406 or the video I/F 410, for causing the image forming apparatus 103 to print the received jobs. The settings management module 457 manages system settings concerning a sheet management system. The system settings include, for example, a setting of a language displayed on a screen of the sheet management system, a setting of a display unit system (millimeters or inches) of a sheet size, and so forth.

FIG. 5 is a diagram showing an example of the top screen 500 of the sheet management application 453, which is displayed on the external display device 113 connected to the print control apparatus 102 appearing in FIG. 1. On the external display device 113, image data drawn in the video memory of the display controller 412 according to an instruction from the CPU 401 is output as video signals, and the top screen 500 is displayed based on the video signals.

In the print control apparatus 102, when the sheet management application 453 is started, the sheet management application 453 acquires device configuration information including information on the configuration of the sheet feed unit 116 and the like from the image forming apparatus 103. The top screen 500 is displayed on the external display device 113 based on this device configuration information. The top screen 500 displays the information indicative of the configuration of the sheet feed unit 116 of the image forming apparatus 103 connected to the print control apparatus 102. Reference numerals 510 to 516 denote sheet feeder buttons associated with the sheet feeders 116-1 to 116-7, respectively. Sheet feeder open buttons 520 to 526 are each a button for providing an instruction for opening an associated one of the sheet feeders 116-1 to 116-7. For example, when the sheet feeder open button 520 associated with the sheet feeder 116-1 is pressed by the user in a state in which the sheet feeder 116-1 is closed, the sheet feeder 116-1 of the image forming apparatus 103 is opened. The sheet feeder buttons 510 to 516 are created based on the device configuration information acquired when the sheet management application 453 is started. The sheet feeder buttons 510 to 516 each have a display area for displaying information, such as a name and a remaining amount of sheets set in an associated sheet feeder. When a sheet feeder state change event indicating a change in the state of the sheet feed unit 116 is received from the image forming apparatus 103, the controller unit 400 reacquires the device configuration information including the information on the configuration of the sheet feed unit 116 and the like, from the image forming apparatus 103. Then, the controller unit 400 redraws the display areas of the sheet feeder buttons 510 to 516 based on the acquired new device configuration information.

A configuration button 502 on the top screen 500 is a button for providing an instruction for displaying a system setting-changing screen (not shown) of the sheet management application 453. When the configuration button 502 is pressed by the user, the controller unit 400 displays the current system settings on the external display device 113 according to the system settings stored in the external storage device 409.

A sheet list button 501 on the top screen 500 is a button for providing an instruction for displaying a sheet list 530 including a plurality of sheet information items as candidates of the settings information for sheet feeders. When the sheet list button 501 is pressed by the user, the controller unit 400 displays the sheet list 530 on the forefront. In FIG. 5, "plain paper" is selected from the sheet list 530. When the user drags a mouse, not shown, in a state in which the item of "plain paper" is selected, so as to select a sheet feeder (sheet feed cassette) for which sheet information is to be set, the display area(s) of the sheet feeder button(s) of the sheet feeder(s) (sheet feed cassette(s)) for which the sheet information can be set is/are highlighted by a dark background color.

In FIG. 5, out of the display areas of the sheet feeder buttons 510 to 516, the display areas of the sheet feeder buttons 514 to 516 associated with the sheet feeders 116-5 to 116-7, respectively, in each of which special sheets for the production print operation are set, are highlighted by the dark background color. This is because a setting of permitting the change of the settings information of the sheet feeders 116-5 to 116-7 by using the sheet management application 453(external application in FIG. 7) has been made on an update permission screen 700 described hereinafter with reference to FIG. 7. When the user releases the dragged mouse button on the display area of the sheet feeder button of a sheet feeder for which a change of the settings information has been permitted using the sheet management application 453, sheet information as the settings information of the sheet feeder associated with this sheet feeder button is changed to the sheet information selected by the user. Thus, in the present embodiment, it is possible to change the settings information of the sheet feeders 116-5 to 116-7, in each of which special sheets for the production print operation are set, out of the sheet feeders 116-1 to 116-7 associated with the sheet feeder buttons 510 to 516, by using the sheet management application 453. The user replaces the sheets in the sheet feeder to the same sheets as the changed sheet information on an as-needed basis. Note that although in the present embodiment, the configuration in which the print control apparatus 102 executes the sheet management application 453 has been described by way of example, the sheet management application 453 can be operated on the client computer 101 and the client computer 119. Even in a case where the client computer 101 or the client computer 119 executes the sheet management application 453, the display contents and the functions are the same as those in the case where the print control apparatus 102 executes the sheet management application 453.

Figure 6:
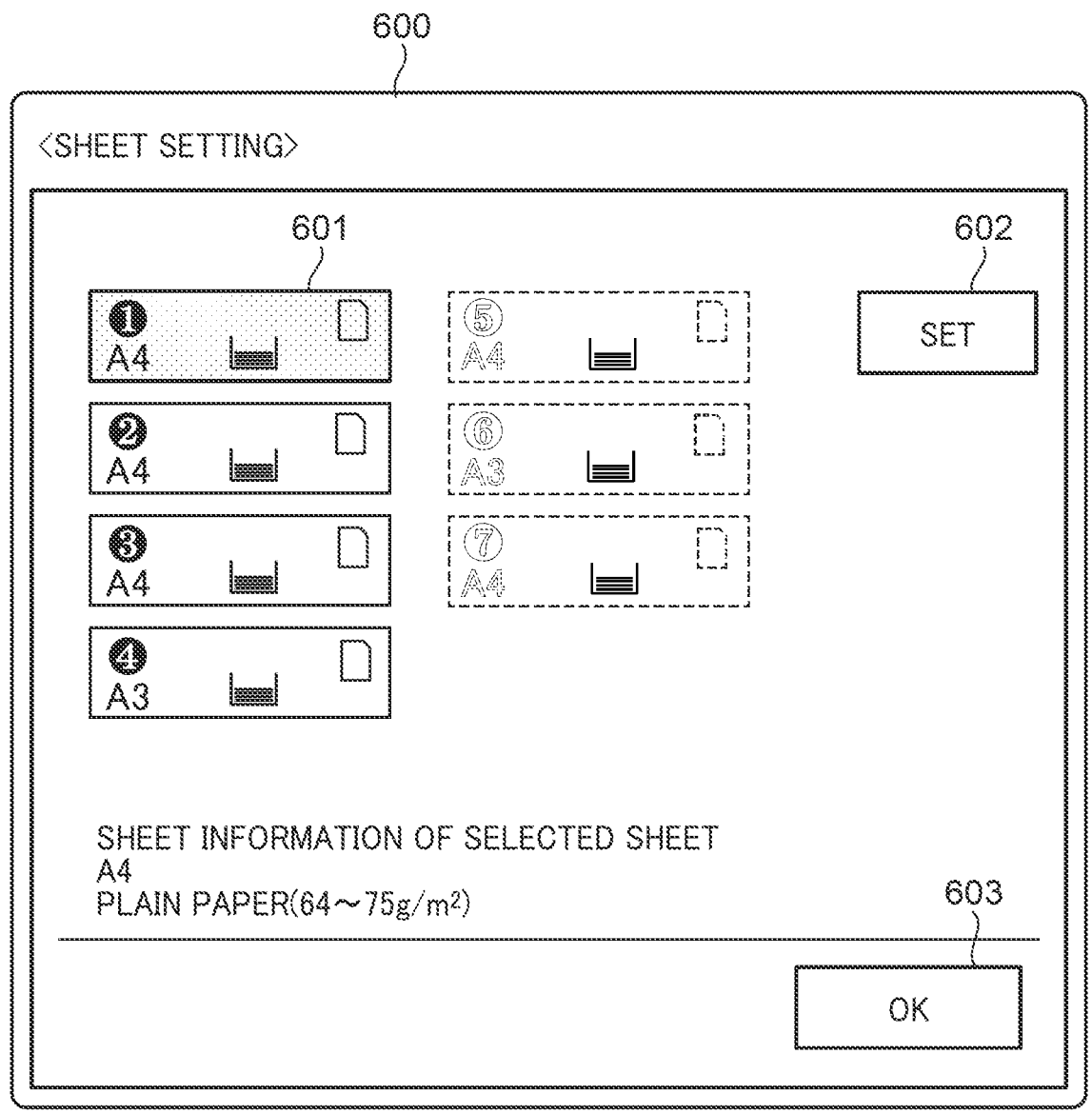
FIG. 6 is a diagram showing an example of a sheet setting screen displayed on an operation panel of the image forming apparatus appearing in FIG. 1.

FIG. 6 is a diagram showing an example of a sheet setting screen 600 displayed on the operation panel 105 of the image forming apparatus 103 appearing in FIG. 1. On the sheet setting screen 600, a plurality of selection buttons associated with the sheet feeders 116-1 to 116-7, respectively, are displayed. Reference numeral 601 denotes a selection button associated with the sheet feeder 116-1, and a size, a type, and a remaining amount of sheets set in the sheet feeder 116-1 are displayed. In FIG. 6, selection buttons are grayed out which are associated with the sheet feeders 116-5 to 116-7, in each of which special sheets for the production print operation are set, out of the sheet feeders 116-1 to 116-7. This is because a setting of inhibiting changing the settings information of the sheet feeders 116-5 to 116-7 by using the operation panel 105 has been made on the update permission screen 700, described hereinafter. The user is incapable of selecting the selection buttons which are grayed out as described above but is capable of selecting the other selection buttons. Thus, in the present embodiment, the settings information can be changed from the operation panel 105, for other ones of the sheet feeders 116-1 to 116-7 associated with the sheet feeder buttons 510 to 516 than the sheet feeders 116-5 to 116-7.

A set button 602 is a button for changing sheet information as the settings information of a sheet feeder associated with a selected selection button. When the set button 602 is pressed by the user, a sheet list, not shown, is displayed on the operation panel 105, and the user can select the sheet information to be set from this sheet list. An OK button 603 is a button for providing an instruction for closing the sheet setting screen 600.

FIG. 7 is a diagram showing an example of the update permission screen 700 displayed on the operation panel 105 of the image forming apparatus 103 appearing in FIG. 1. The update permission screen 700 is a screen for prompting a user to set a condition for permitting a change of the settings information of each of the sheet feeders 116-1 to 116-7. With this, it is possible to cause the user's intention to be reflected on whether or not to permit changing the settings information of each of the sheet feeders 116-1 to 116-7. The update permission screen 700 has check boxes 701 and check boxes 702. Each check box 701 is for specifying, for each sheet feeder (sheet feed cassette), whether or not to permit changing the settings information of the sheet feeder by using the sheet management application 453. Each check box 702 is for specifying, for each sheet feeder (sheet feed cassette), whether or not to permit changing the settings information of the sheet feeder by using the operation panel 105. With this, the administrator user can set the condition for permitting a change of the settings information of the sheet feeders on a sheet feeder-by-sheet feeder basis. An OK button 703 is a button for finalizing the settings on the update permission screen 700. When the OK button 703 is pressed by the user, the information set on the update permission screen 700 is stored in the nonvolatile memory 309 as the change permission/inhibition information. With this, it is possible to easily determine, using the change permission/inhibition information, whether the settings information of each of the sheet feeders 116-1 to 116-7 is permitted to be changed. A cancel button 704 is a button for canceling the contents input on the update permission screen 700 e.g. in a case where the input contents include an error. Note that although in the present embodiment, the description has been given of the configuration in which the update permission screen 700 is displayed on the operation panel 105 of the image forming apparatus 103 by way of example, the update permission screen 700 may be displayed on the external display device 113 connected to the print control apparatus 102. With this, the administrator user can set the condition for permitting a change of the settings information of the sheet feeders on a sheet feeder-by-sheet feeder basis, from the print control apparatus 102.

Figure 8:
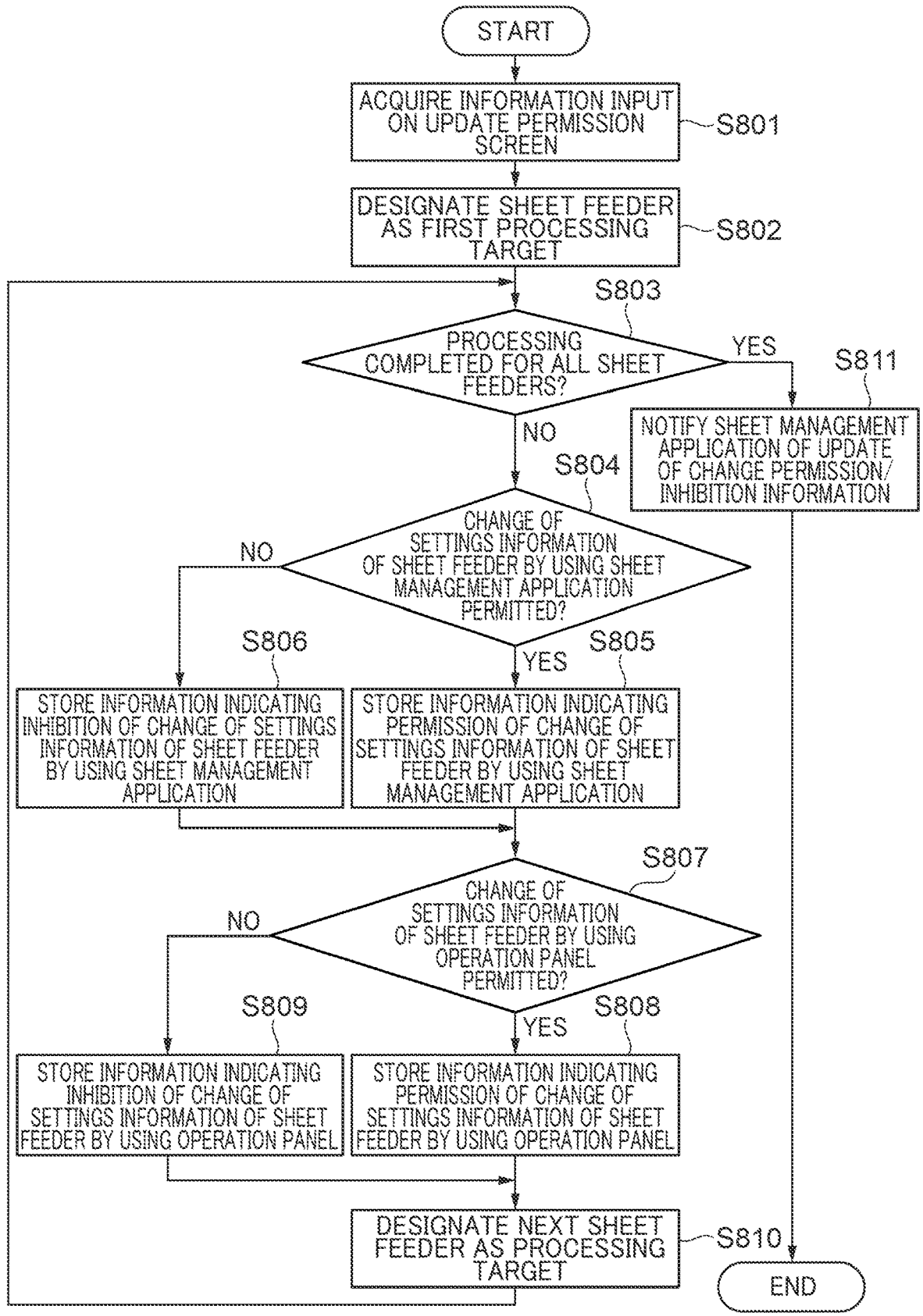
FIG. 8 is a flowchart of a notification process performed by the image forming apparatus appearing in FIG. 1.

FIG. 8 is a flowchart of a notification process performed by the image forming apparatus 103 appearing in FIG. 1. This notification process is performed by the sheet feeder management module 354 of the image forming apparatus 103 and is realized by the CPU 301 executing a program loaded into the RAM 302. This notification process is executed when the OK button 703 on the update permission screen 700 is pressed by the user.

Referring to FIG. 8, first, the sheet feeder management module 354 acquires information input to the update permission screen 700 by the user, from the UI control module 352 (step S801). Then, the sheet feeder management module 354 designates, out of the sheet feeders 116-1 to 116-7, the sheet feeder 116-1 as a first target of processing of the present process (step S802). Then, the sheet feeder management module 354 determines whether or not the processing has been completed for all of the sheet feeders forming the sheet feed unit 116 (step S803).

If it is determined in the step S803 that the processing has not been completed for any one of the sheet feeders forming the sheet feed unit 116, the process proceeds to a step S804. In the step S804, the sheet feeder management module 354 determines whether or not a change of the settings information of the designated sheet feeder by using the sheet management application 453 is permitted.

If it is determined in the step S804 that a change of the settings information of the designated sheet feeder by using the sheet management application 453 is permitted, the process proceeds to a step S805. In the step S805, the sheet feeder management module 354 stores the information that a change of the settings information by using the sheet management application 453 is permitted, in the settings management module 357, in association with the designated sheet feeder. Then, the process proceeds to a step S807, described hereinafter.

If it is determined in the step S804 that a change of the settings information of the designated sheet feeder by using the sheet management application 453 is not permitted, the process proceeds to a step S806. In the step S806, the sheet feeder management module 354 stores the information that a change of the settings information by using the sheet management application 453 is not permitted, in the settings management module 357, in association with the designated sheet feeder. Then, the process proceeds to the step S807, wherein the sheet feeder management module 354 determines whether or not a change of the settings information of the designated sheet feeder by using the operation panel 105 is permitted (step S807).

If it is determined in the step S807 that a change of the settings information of the designated sheet feeder by using the operation panel 105 is permitted, the process proceeds to a step S808. In the step S808, the sheet feeder management module 354 stores the information that a change of the settings information by using the operation panel 105 is permitted, in the settings management module 357, in association with the designated sheet feeder. Then, the process proceeds to a step S810, described hereinafter.

If it is determined in the step S807 that a change of the settings information of the designated sheet feeder by using the operation panel 105 is not permitted, the process proceeds to a step S809. In the step S809, the sheet feeder management module 354 stores the information that a change of the settings information by using the operation panel 105 is not permitted, in the settings management module 357, in association with the designated sheet feeder. Then, the sheet feeder management module 354 designated the next sheet feeder as the target of processing (step S810), and the process returns to the step S803. Thus, in the present embodiment, information input by the user on the update permission screen 700 as the condition for permitting a change of the settings information of a sheet feeder is associated with each of the sheet feeders 116-1 to 116-7.

If it is determined in the step S803 that the processing has been completed for all of the sheet feeders forming the sheet feed unit 116, the sheet feeder management module 354 requests the settings management module 357 to save the change permission/inhibition information. The settings management module 357 having received this request saves the information stored in the steps S805, S806, S809, and S810 as the condition for permitting a change of the settings information of each of the sheet feeders 116-1 to 116-7, in the nonvolatile memory 309, as the change permission/inhibition information. Further, the sheet feeder management module 354 notifies the sheet management application 453 via the network control module 355 that the change permission/inhibition information has been updated (step S811). After that, the present process is terminated.

Figure 9A:
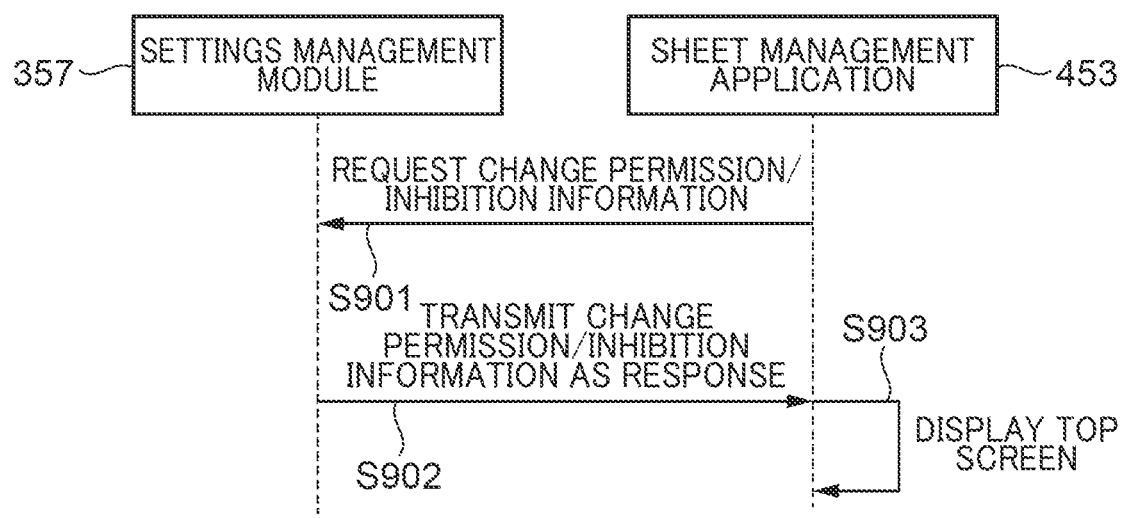
FIGS. 9A and 9B are each a sequence diagram of a process performed by the printing system shown in FIG. 1, for controlling the display of sheet settings-related screens.
Figure 9B:
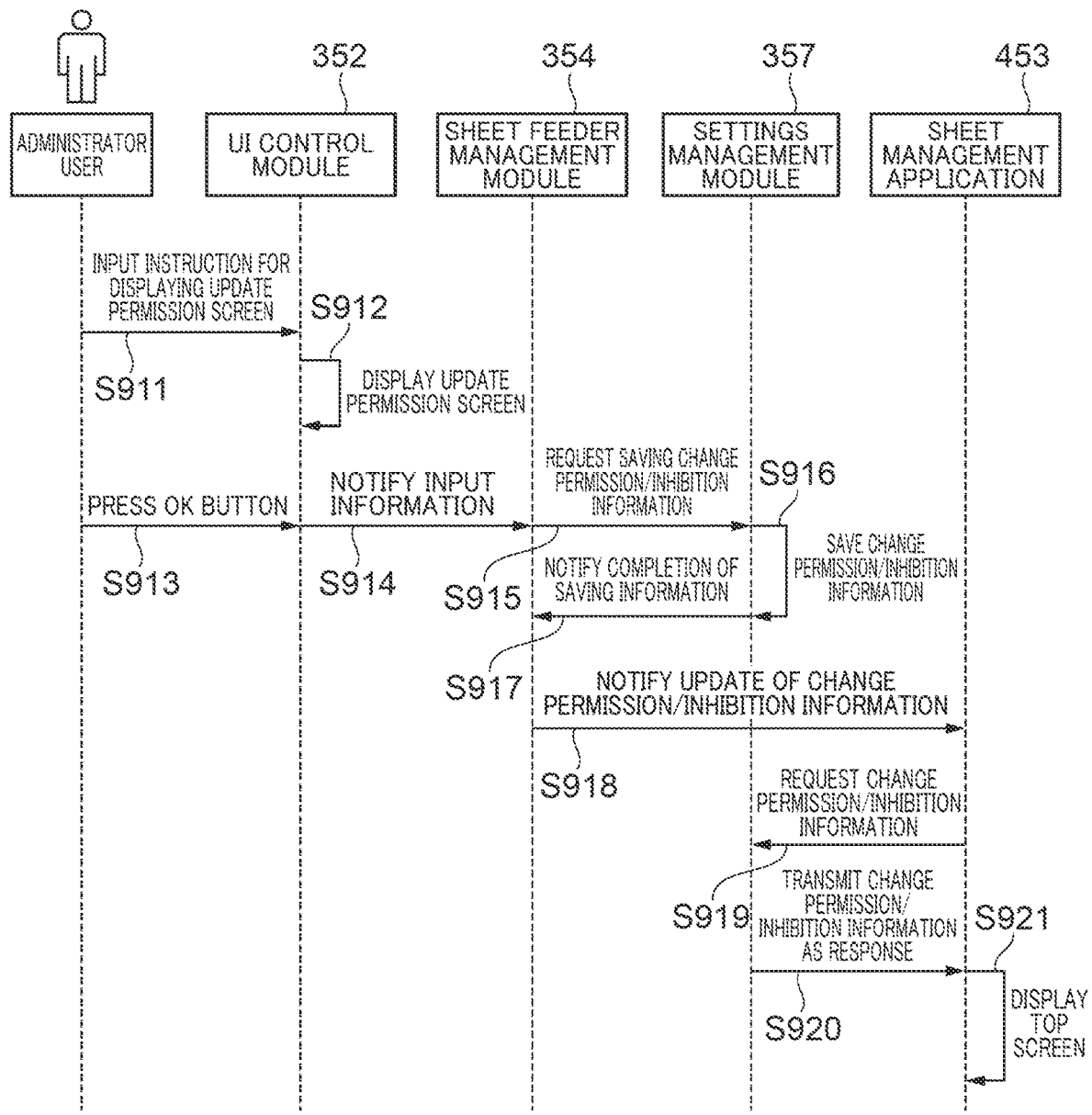

FIGS. 9A and 9B are each a sequence diagram of a process for controlling the display of sheet settings-related screens, which process is performed by the printing system 100 shown in FIG. 1. FIG. 9A shows a sequence of the process for controlling the display of the sheet settings-related screens in a case where the change permission/inhibition information is requested from the print control apparatus 102. For example, in a case where the sheet management application 453 is started, the print control apparatus 102 sends a request for transmitting the change permission/inhibition information, to the image forming apparatus 103.

Referring to FIG. 9A, first, the sheet management application 453 sends the request for transmitting the change permission/inhibition information, to the settings management module 357 of the image forming apparatus 103 (step S901). The settings management module 357 transmits the change permission/inhibition information stored in the nonvolatile memory 309 to the sheet management application 453 as a response (step S902). The sheet management application 453 displays the top screen 500 on the external display device 113 based on the received change permission/inhibition information (step S903). In FIG. 5, out of the display areas of the sheet feeder buttons 510 to 516, the display areas of the sheet feeder buttons 514 to 516 associated with the sheet feeders 116-5 to 116-7, respectively, are highlighted by the dark background color. The sheet feeders 116-5 to 116-7 are sheet feeders for which a change of the settings information of the sheet feeder by using the sheet management application 453 is permitted.

FIG. 9B shows a sequence of the process for controlling the display of the sheet settings-related screens in a case where the change permission/inhibition information is updated on the update permission screen 700.

Referring to FIG. 9B, when the administrator user inputs an instruction for displaying the update permission screen 700 to the operation panel 105 of the image forming apparatus 103 (step S911), the UI control module 352 displays the update permission screen 700 on the operation panel 105 (step S912). Then, the administrator user checks selected one(s) of the check boxes 701 and 702 on the update permission screen 700 and presses the OK button 703 (step S913). The UI control module 352 notifies the information input by the user on the update permission screen 700 to the sheet feeder management module 354 of (step S914).

The sheet feeder management module 354 performs the notification process described above with reference to FIG. 8. The sheet feeder management module 354 requests the settings management module 357 to save the change permission/inhibition information, as described above (step S915). The settings management module 357 saves the change permission/inhibition information in the nonvolatile memory 309 according to this request (step S916), and when the change permission/inhibition information has been saved, the settings management module 357 notifies this fact to the sheet feeder management module 354 (step S917). Then, the sheet feeder management module 354 notifies the sheet management application 453 that the change permission/inhibition information has been updated (step S918). The sheet management application 453 having received this notification sends the request for transmitting the change permission/inhibition information, to the settings management module 357 (step S919). The settings management module 357 transmits the change permission/inhibition information saved in the nonvolatile memory 309 to the sheet management application 453 as a response (step S920). The sheet management application 453 displays the top screen 500 on the external display device 113 based on the received change permission/inhibition information (step S921). Thus, the change permission/inhibition information updated by the administrator user is reflected on the top screen 500 of the sheet management application 453.

FIG. 10 is a flowchart of a sheet feeder information-setting process performed by the image forming apparatus 103 appearing in FIG. 1. The sheet feeder information-setting process is performed by the sheet feeder management module 354 of the image forming apparatus 103 and is realized by the CPU 301 executing a program loaded into the RAM 302. The sheet feeder information-setting process is executed when the user provides an instruction for changing the settings information of a designated sheet feeder, by operating the sheet setting screen 600 displayed on the operation panel 105 or by operating the top screen 500 of the sheet management application 453 started e.g. in the print control apparatus 102. When this changing instruction is provided, a settings information change request is transmitted from the operation panel 105 or the sheet management application 453 to the sheet feeder management module 354 of the image forming apparatus 103. The settings information change request is an instruction for changing the settings information of a sheet feeder, designated by the user, out of the sheet feeders 116-1 to 116-7. The settings information change request includes information indicative of a sheet feeder designated by the user on the sheet setting screen 600 or the top screen 500, and sheet information designated by the user on the sheet setting screen 600 or the top screen 500.

Referring to FIG. 10, first, the sheet feeder management module 354 receives a settings information change request from the operation panel 105 or the sheet management application 453 (step S1001). Then, the sheet feeder management module 354 determines whether or not the source of this request is the sheet management application 453 (step S1002). In the step S1002, for example, in a case where the settings information change request has been received via the control cable 108, it is determined that the request source is the sheet management application 453. On the other hand, in a case where the settings information change request has not been received via the control cable 108, it is determined that the request source is not the sheet management application 453.

If it is determined in the step S1002 that the request source is the sheet management application 453, the process proceeds to a step S1003. In the step S1003, the sheet feeder management module 354 determines whether or not a change of the settings information of the sheet feeder by using the sheet management application 453 is permitted, based on the change permission/inhibition information saved in the nonvolatile memory 309.

If it is determined in the step S1003 that a change of the settings information of the sheet feeder by using the sheet management application 453 is not permitted, the sheet feeder management module 354 does not update the sheet information of the designated sheet feeder, but notifies the sheet management application 453 as the request source that the change of the settings information of the sheet feeder has failed (step S1004), followed by terminating the present process.

If it is determined in the step S1003 that a change of the settings information of the sheet feeder by using the sheet management application 453 is permitted, the process proceeds to a step S1005. In the step S1005, the sheet feeder management module 354 changes the settings information of the sheet feeder. More specifically, the sheet feeder management module 354 changes the sheet information of a sheet feeder indicated by the received settings information change request, to sheet information indicated by the received settings information change request. Then, the sheet feeder management module 354 notifies the sheet management application 453 as the request source that the change of the settings information of the sheet feeder is successful, followed by terminating the present process.

If it is determined in the step S1002 that the request source is not the sheet management application 453, it is determined that the request source is the operation panel 105. In this case, the sheet feeder management module 354 determines, based on the change permission/inhibition information saved in the nonvolatile memory 309, whether or not a change of the settings information of the sheet feeder by using the operation panel 105 is permitted (step S1006).

If it is determined in the step S1006 that a change of the settings information of the sheet feeder by using the operation panel 105 is permitted, the process proceeds to the step S1005. With this, the sheet information of the sheet feeder indicated by the received settings information change request is changed to sheet information indicated by the received settings information change request. If it is determined in the step S1006 that a change of the settings information of the sheet feeder by using the operation panel 105 is not permitted, the process proceeds a step S1007. In the step S1007, the sheet feeder management module 354 displays a change failure screen indicating that a change of the settings information of the sheet feeder has failed, on the operation panel 105, followed by terminating the present process.

Note that in the present embodiment, when the change permission/inhibition information is changed, as shown in FIG. 9B, the changed contents of the change permission/inhibition information are immediately reflected e.g. on the top screen 500. Therefore, for example, on the top screen 500, the user ought to be incapable of providing an instruction for changing the settings information of a sheet feeder for which a change of the settings information of the sheet feeder by using the sheet management application 453 is not permitted. However, in some cases, there is a possibility that a settings information change request is provided immediately before changing the change permission/inhibition information, and hence the sheet information-setting process in FIG. 10 plays a role of protecting the sheet information such that an unintended change of the sheet information is performed.

According to the above-described embodiment, in a case where the request source of the settings information change request satisfies the condition for permitting a change of the settings information of a sheet feeder, the settings information of a sheet feeder designated by the settings information change request is changed. Further, in a case where the request source of the settings information change request does not satisfy the condition for permitting a change of the settings information of a sheet feeder, the settings information of a sheet feeder designated by the settings information change request is not changed. This makes it possible to prevent an unintended change of the settings information of the sheet feeder.

Further, in the above-described embodiment, in a case where the request source of the settings information change request is the sheet management application 453, the settings information of any of specific ones, in which special sheets for the production print operation are set, of the sheet feeders 116-1 to 116-7 is changed. That is, the settings information of the specific sheet feeder is changed only according to a settings information change request from the sheet management application 453. This makes it possible to prevent an unintended change of the settings information of the specific sheet feeder.

In the above-described embodiment, in a case where the request source of the settings information change request is the operation panel 105, the settings information of a sheet feeder other than the specific one(s) of the sheet feeders 116-1 to 116-7 is changed. That is, the settings information of a sheet feeder other than the specific sheet feeder(s) is changed only according to a settings information change request from the operation panel 105. This makes it possible to prevent an unintended change of the settings information of a sheet feeder other than the specific sheet feeder(s).

Further, although in the above-described embodiment, the configuration of the printing system 100 in which the image forming apparatus 103 is an apparatus provided separately from the print control apparatus 102 has been described, this is not limitative. For example, the image forming apparatus 103 may have the function of the print control apparatus 102 and execute the above-described process performed by the print control apparatus 102. In this configuration, the printing system 100 is not necessarily required to include the print control apparatus 102.

Next, a case where a print instruction is provided from the client computer 101 or the client computer 119 will be described.

FIG. 11 is a diagram showing an example of an operation screen 1101 of print job management software in the present embodiment. The print job management software can operate on all of the client computers connected to the LAN 110, including the client computer 119, and on the print control apparatus 102. The user of the printing system 100 can confirm a state of a print job managed by the print control apparatus 102 and a state of the image forming apparatus 103, using this operation screen 1101. A variety of information items are displayed in display areas of the operation screen 1101. For example, on the left side of the screen, a print server list-displaying section 1102 and a consumables displaying section 1104 are displayed. Further, in a central area of the screen, a printing-jobs list 1103, an RIP-jobs list 1105, and a printed-jobs list 1106 are displayed. The user can select a job displayed in these lists and perform editing of attributes of the job, such as changing the number of copies or a finishing method.

Figure 12:
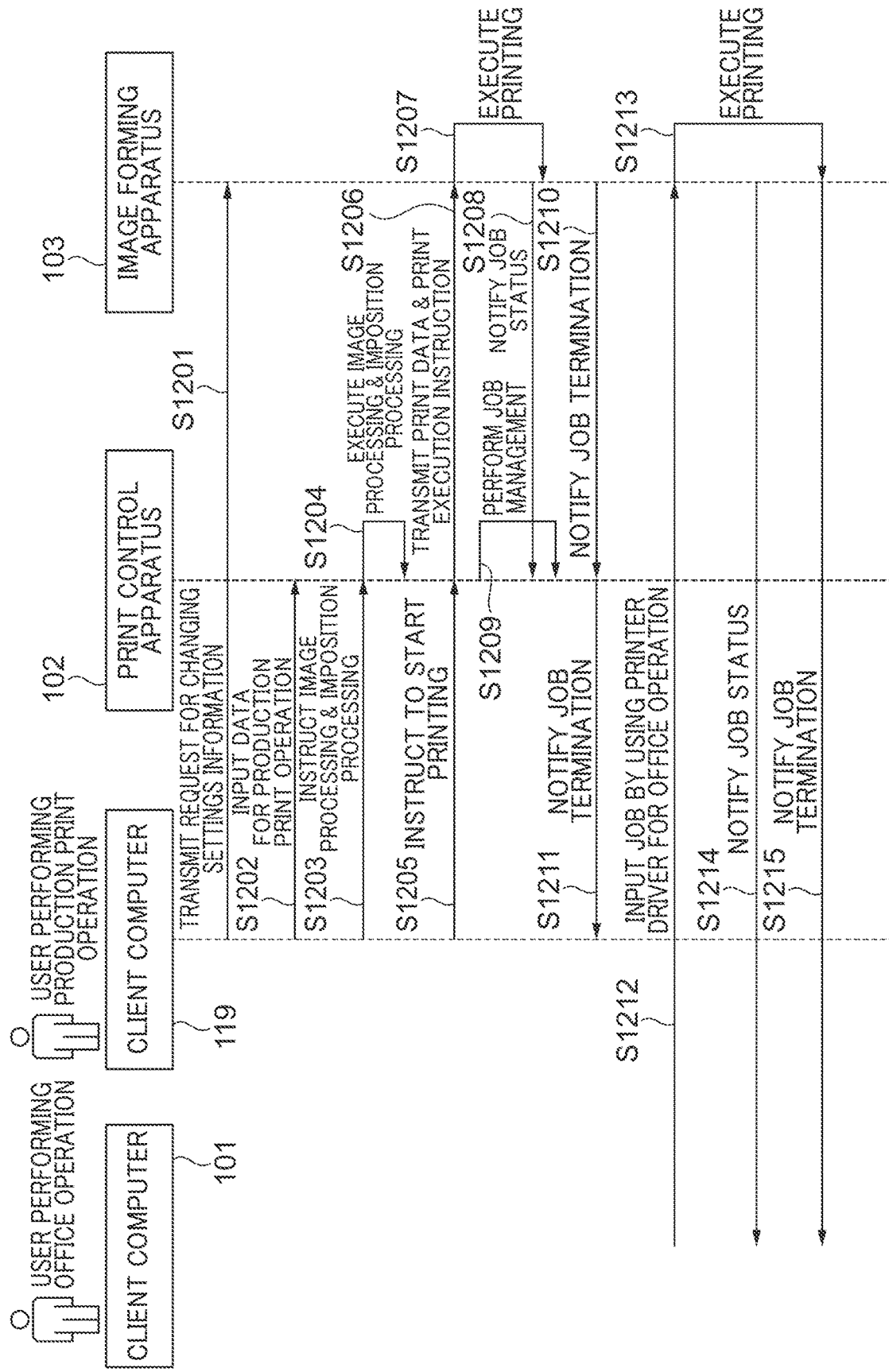
FIG. 12 is a sequence diagram of a print control process performed by the printing system shown in FIG. 1.

FIG. 12 is a sequence diagram of a print control process performed by the printing system 100 shown in FIG. 1. In the following description, a case where a user performing an office operation provides a print instruction by using the client computer 101, and a user performing a production print operation provides a print instruction by using the client computer 119 will be described by way of example. Note that the client computer 101 and the client computer 119 are the same in hardware. In the client computer 101, an office operation application and a printer driver of the image forming apparatus 103 have been installed. On the other hand, in the client computer 119, the above-described print job management software for using the print control apparatus 102 and a printer driver of the print control apparatus 102, which is capable of making more detailed settings, have been installed. Further, in the client computer 119, the sheet management application 453 appearing in FIG. 4B has also been installed.

Referring to FIG. 12, first, a sequence of processing operations of the production printing using the client computer 119 will be described. When sheet replacement is required, the client computer 119 transmits a settings information change request as an instruction for changing the settings information of the sheet feeders 116-1 to 116-7 to the image forming apparatus 103 by using the sheet management application 453 (step S1201). Note that in this step, it is assumed that a setting of inhibiting changing the settings information of the sheet feeders 116-1 to 116-4 by using the sheet management application 453 has been made on the update permission screen 700. The sheet feeders 116-1 to 116-4 are sheet feeders other than the specific sheet feeders in which the special sheets for the production print operation are set. With this, the settings information of the sheet feeders other than the specific sheet feeders, i.e. the settings information of the sheet feeders 116-1 to 116-4 used for the office operation is prevented from being changed by the user performing the production print operation.

Then, the client computer 119 inputs data for the production print operation, such as a PDF file, to the print control apparatus 102 (step S1202). Then, the client computer 119 instructs the print control apparatus 102 to perform image processing including changing parameters of the input production print operation data and imposition processing (step S1203). The print control apparatus 102 executes a variety of processing according to this instruction (step S1204). Then, the client computer 119 instructs the print control apparatus 102 to start printing the production print operation data (step S1205). The print control apparatus 102 having received this instruction transmits image data and a print execution instruction to the image forming apparatus 103 after executing RIP (step S1206). The image forming apparatus 103 executes printing on sheets fed from the designated sheet feeder according to this instruction (step S1207). The image forming apparatus 103 sequentially notifies the print control apparatus 102 of a status of the print job during execution of the printing (step S1208). The print control apparatus 102 performs job management based on this notification (step S1209). More specifically, the print control apparatus 102 monitors the printing status of the image forming apparatus 103. When the printing is terminated, the image forming apparatus 103 notifies the print control apparatus 102 of termination of the printing (termination of the job) (step S1210). The print control apparatus 102 having received this notification notifies the client computer 119 of termination of the printing (termination of the job) (step S1211). Note that for printing data input for a production print operation, sheets in all of the sheet feeders can be used. The image forming apparatus 103 does not limit sheet feeders to be used for printing depending on a print input source. That is, for printing data for a production print operation, not only a sheet feeder for which a change of settings information of the sheet feeder by using the sheet management application 453 is permitted on the update permission screen 700, but also a sheet feeder for which the above-mentioned change is not permitted on the same can be used.

Next, a sequence of processing operations of the office printing using the client computer 101 will be described. A user performing an office operation directly inputs a print job to the image forming apparatus 103 using the printer driver for the image forming apparatus 103, which is installed in the client computer 101 (step S1212). The print control apparatus 102 executes printing on sheets fed from the designated sheet feeder according to the instruction received from the printer driver (step S1213). The image forming apparatus 103 sequentially notifies the print control apparatus 102 of a status of the print job during execution of the printing (step S1214), and the printing status is reflected on the printer driver on the client computer 101. When the printing is terminated, the image forming apparatus 103 notifies the client computer 101 of termination of the printing (termination of the job) (step S1215), followed by terminating the present process.

Thus, in the present embodiment, it is possible to prevent an unintended change of settings information of a sheet feeder while making it possible to execute an office operation and a production print operation using the image forming apparatus 103 as a single unit.

Further, in the above-described embodiment, as the condition for permitting a change of the settings information, an IP address of a request source which is permitted to change the settings information may be set.

In the above-described embodiment, the description has been given of the configuration of setting which of the sheet management application 453 and the operation panel 105 is permitted to change the settings information, on a sheet feeder-by-sheet feeder basis. On the other hand, the sheet management application 453 can operate not only on the print control apparatus 102, but also on a plurality of apparatuses, such as the client computer 101 and the client computer 119. Therefore, it is preferable to permit changing the settings information of a specific sheet feeder used for a production print operation only to a specific client computer used for the production print operation, out of the plurality of apparatuses on which the sheet management application 453 can operate. To realize this, a mechanism is required which is capable of identifying a specific client computer used for the production print operation, out of the plurality of apparatuses on which the sheet management application 453 can operate. To meet this requirement, in the present embodiment, as a condition for permitting a change of the settings information, an IP address of a request source for which a change of the settings information is permitted is set on an update permission screen 1300 shown in FIG. 13.

FIG. 13 is a diagram showing an example of the update permission screen 1300 displayed on the operation panel 105 of the image forming apparatus 103 appearing in FIG. 1. On the update permission screen 1300, IP addresses of apparatuses permitted to change the settings information are input to text boxes 1302 of associated ones of the sheet feeders 116-1 to 116-7. Assuming a check box 1301 has been checked (selected), in a case where a settings information change request is received from the apparatus having the IP address input in the text box 1302 associated therewith, the settings information of the sheet feeder is changed according to this settings information change request. Further, on the update permission screen 1300, IP addresses of apparatuses inhibited to change the settings information are input to text boxes 1304 of associated ones of the sheet feeders 116-1 to 116-7. Assuming a check box 1303 has been checked, in a case where a settings information change request is received from the apparatus having the IP address input in the text box 1304, the settings information of the sheet feeder is not changed according to this settings information change request.

Further, the update permission screen 1300 includes a text box 1305 for inputting a time period. A desired time period can be input to the text box 1305 in units of minutes. When the time period input in the text box 1305 elapses without using any one sheet feeder of the sheet feeders 116-1 to 116-7, a settings information change request for changing the settings information of the one sheet feeder is accepted from an apparatus having any IP address. When an OK button 1306 is pressed, the information set on the update permission screen 1300 is saved in the nonvolatile memory 309 as the change permission/inhibition information. Note that the print job management software also has the function of changing the settings information of a sheet feeder. Therefore, whether or not a change of the settings information of the sheet feeder by using the print job management software is permitted is also controlled based on the settings on the update permission screen 1300 shown in FIG. 13.

Note that although in the present embodiment, the configuration of the printing system 100 in which the update permission screen 1300 is displayed on the operation panel 105 of the image forming apparatus 103 has been described by way of example, this is not limitative. For example, the update permission screen 1300 may be displayed on the external display device 113 connected to the print control apparatus 102, and the display section of the client computer 101 or the client computer 119.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-042124 filed Mar. 17, 2022, which is hereby incorporated by reference herein in its entirety.

What is claimed is:

1. An image forming apparatus, comprising:
   an operation panel;
   a printer that prints an image on a sheet conveyed from a sheet holding unit;
   a network interface that receives, from an external apparatus via a network, a first request for changing a setting of a sheet stored in the sheet holding unit; and
   a controller that sets whether to permit the changing of the setting in accordance with the first request,
   wherein the controller changes, in a case where the changing of the setting is set to be permitted in accordance with the first request, the setting in accordance with the first request received by the network interface, and the controller does not change, in a case where the changing of the setting is not set to be permitted in accordance with the first request, the setting in accordance with the first request received by the network interface,
   wherein the controller further sets whether to permit the changing of the setting in accordance with a second request received via the operation panel, and
   wherein the controller further changes, in a case where the changing of the setting is set to be permitted in accordance with the second request, the setting in accordance with the second request received via the operation panel, and the controller does not change, in a case where the changing of the setting is not set to be permitted in accordance with the second request, the setting in accordance with the second request received via the operation panel.

2. The image forming apparatus according to claim 1, further comprising the sheet holding unit.

3. The image forming apparatus according to claim 1, further comprising a plurality of sheet holding units,
   wherein the controller sets, for each of the plurality of sheet holding units, whether to permit a changing of a setting of a sheet in accordance with the first request.

4. The image forming apparatus according to claim 1, further comprising an operation panel,
   wherein the controller sets, for each of the plurality of sheet holding units, whether to permit changing of a setting in accordance with the second request.

5. The image forming apparatus according to claim 1, wherein the image forming apparatus is able to communicate with a plurality of external apparatuses, and wherein the controller sets, for each of the plurality of the external apparatuses, whether to permit changing of a setting in accordance with a third request received from each of the plurality of the external apparatuses.

6. The image forming apparatus according to claim 1, wherein the setting is a setting regarding a type of the sheet.

7. The image forming apparatus according to claim 1, wherein the setting is a setting regarding a basis weight of the sheet.

8. The image forming apparatus according to claim 1, wherein whether to permit the changing of the setting in accordance with the first request and whether to permit the changing of the setting in accordance with the second request received via the operation panel are set by a user via the same screen.

9. A method of controlling an image forming apparatus that includes an operation panel and a printer that prints an image on a sheet conveyed from a sheet holding unit, the method comprising:

receiving, from an external apparatus via a network, a first request for changing a setting of a sheet stored in the sheet holding unit;

setting whether to permit the changing of the setting in accordance with the first request;

changing, in a case where the changing of the setting is set to be permitted in accordance with the first request, the setting in accordance with the first request received via the network;

not changing, in a case where the changing of the setting is not set to be permitted in accordance with the first request, the setting in accordance with the first request received via the network;

setting whether to permit the changing of the setting in accordance with a second request received via the operation panel;

changing, in a case where the changing of the setting is set to be permitted in accordance with the second request, the setting in accordance with the second request received via the operation panel; and not changing, in a case where the changing of the setting is not set to be permitted in accordance with the second request, the setting in accordance with the second request received via the operation panel.

10. A non-transitory computer-readable storage medium storing a program for causing a computer to execute a method of controlling an image forming apparatus that includes an operation panel and a printer that prints an image on a sheet conveyed from a sheet holding unit, wherein the method comprises:

receiving, from an external apparatus via a network, a first request for changing a setting of a sheet stored in the sheet holding unit;

setting whether to permit the changing of the setting in accordance with the first request;

changing, in a case where the changing of the setting is set to be permitted in accordance with the first request, the setting in accordance with the first request received via the network;

not changing, in a case where the changing of the setting is not set to be permitted in accordance with the first request, the setting in accordance with the first request received via the network;

setting whether to permit the changing of the setting in accordance with a second request received via the operation panel;

changing, in a case where the changing of the setting is set to be permitted in accordance with the second request, the setting in accordance with the second request received via the operation panel; and not changing, in a case where the changing of the setting is not set to be permitted in accordance with the second request, the setting in accordance with the second request received via the operation panel.

* * * * *